United States Patent [19]

Lewis et al.

[11] 3,907,375
[45] Sept. 23, 1975

[54] HYDRAULICALLY ACTUATED ADAPTIVE BRAKING SYSTEM USING A SINGLE FLUID

[75] Inventors: Richard L. Lewis; Jerome T. Ewald; Martin A. Shields, all of South Bend, Ind.

[73] Assignee: The Bendix Corporation, South Bend, Ind.

[22] Filed: July 12, 1973

[21] Appl. No.: 378,756

Related U.S. Application Data

[62] Division of Ser. No. 179,919, Sept. 13, 1971, Pat. No. 3,761,140.

[52] U.S. Cl............ 303/6 R; 60/535; 60/548; 188/345
[51] Int. Cl.² ............ B60T 8/02; B60T 13/14
[58] Field of Search ............ 303/6 C, 21 F, 21 AF; 188/181 A, 345; 60/548, 534, 535, 578, 585, 592, 572, 547; 91/391

[56] References Cited
UNITED STATES PATENTS

| | | | |
|---|---|---|---|
| 3,354,639 | 11/1967 | Yost | 60/548 |
| 3,382,675 | 5/1968 | Wallace | 188/345 X |
| 3,499,287 | 3/1970 | Schrader | 188/345 X |
| 3,610,102 | 10/1971 | Brown, Jr. | 60/548 |
| 3,640,067 | 2/1972 | Ingram | 188/345 X |
| 3,729,235 | 4/1973 | Bach et al. | 303/21 F |

Primary Examiner—Trygve M. Blix
Assistant Examiner—Douglas C. Butler
Attorney, Agent, or Firm—Ken C. Decker; William N. Antonis

[57] ABSTRACT

A hydraulic adaptive braking system which uses a single fluid to both actuate the brakes of the vehicle and to provide a power assist to the vehicle operator when the brakes are applied. The system includes a brake booster which utilizes pressurized fluid from the vehicle's power steering pump to develop braking pressure which is communicated to the brakes of the vehicle. Adaptive braking valve assembly is located in both the front and the rear brake lines and include electrically operated valve device which controls fluid communication between the booster, the brakes of the vehicle and a fluid reservoir. When an incipient skid condition is sensed, the electrically operated valve device terminates fluid communication between the booster and the vehicle's brakes, and then initiates communication between the vehicle's brakes and the aforementioned reservoir to permit braking pressure at the brakes of the vehicle to decay. When the incipient skid condition terminates, the electrically operated valve device again communicates braking pressure to the vehicle's brakes.

8 Claims, 5 Drawing Figures

3,907,375

HYDRAULICALLY ACTUATED ADAPTIVE BRAKING SYSTEM USING A SINGLE FLUID

This is a division, of Application Ser. No. 179,919, filed Sept. 13, 1971, now U.S. Pat. No. 3,761,140.

BACKGROUND OF THE INVENTION

This invention relates to a hydraulically powered adaptive braking system for automotive vehicles.

While many automotive adaptive braking systems have been proposed before, most of these systems have not been widely used, mainly because all of the adaptive braking systems which have been proposed in the prior art have been very expensive to manufacture. One reason why prior art adaptive braking systems have been expensive is that they have required two separate fluid systems for brake actuation. For example, adaptive braking systems currently on the market have one hydraulic system requiring brake fluid to actuate the vehicle's brakes, and another pneumatic system which operates the adaptive braking system and which provides a power assist to the vehicle operator. Adaptive braking systems have been proposed in which power steering fluid is used to provide a braking assist to the vehicle operator, but these systems still retain two separate hydraulic systems. To simplify design of an adaptive braking system, it is desirable to provide a system in which a common fluid is used to both actuate the brakes of the vehicle and also to provide a power assist to the vehicle operator. These systems have not heretofore been developed because of a number of problems. One of these problems has been the difficulty of designing a common fluid system which provides fail-safe capability at least equal to the fail-safe capability of existing braking systems.

SUMMARY OF THE INVENTION

Therefore, an important object of our invention is to provide an automotive adaptive braking system which utilizes a single fluid.

Another important object of our invention is to provide a common fluid adaptive braking system which has fail-safe capability at least equal to existing two-fluid systems.

Another important object of our invention is to simplify the design of an adaptive braking system.

Another important object of our invention is to provide a hydraulic brake booster which combines the functions of existing master cylinders and brake boosters.

Still another important object of our invention is to provide a simple adaptive braking control valve.

DETAILED DESCRIPTION

Figure 1:
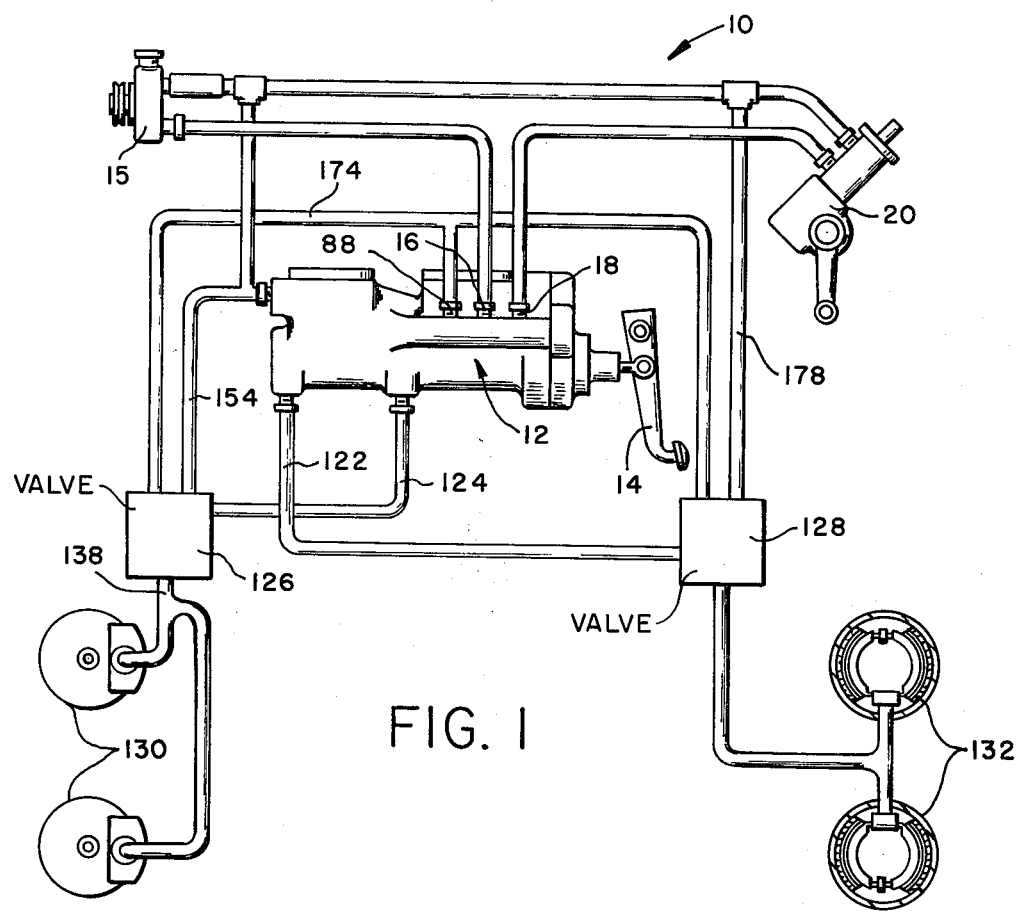
FIG. 1 is a schematic illustration of an adaptive braking system made pursuant to the teachings of our present invention.
Figure 2:
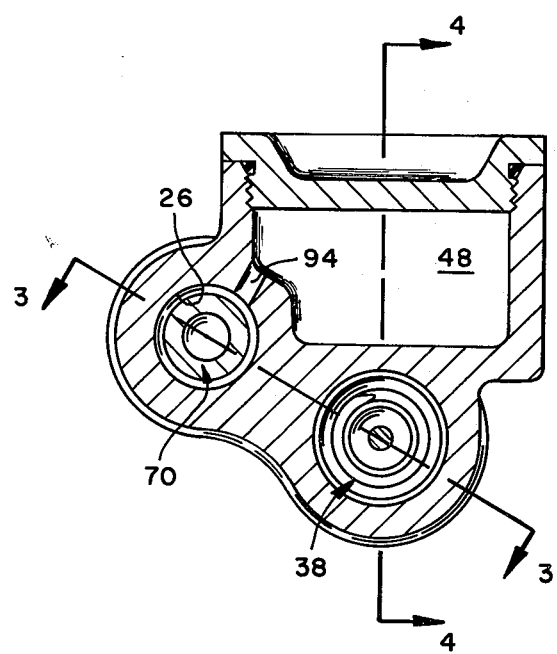
FIG. 2 is a transverse cross-sectional view of a brake booster made pursuant to the teachings of our present invention and which is used in the system illustrated in FIG. 1, and is taken substantially along lines 2—2 of FIG. 3.

Referring now to the drawings, an adaptive braking system generally indicated by the numeral 10 includes a brake booster 12 actuated by the normal pedal 14 mounted in the operator's compartment of the vehicle. An inlet port 16 of the booster 12 is communicated to the outlet or high pressure side of the vehicle's power steering pump 15. The booster 12 includes an outlet port 18 communicated to the inlet of the vehicle's power steering gear 20. The outlet of the gear 20 is communicated to a reservoir (not shown) which is communicated to the inlet of the pump 15.

The booster 12 includes a housing 22 defining a first bore 24 and a second bore 26 therewithin, each of which communicate into a common pressure chamber 28. A primary piston 30 and a secondary piston 32 are slidably mounted in the bore 24 and define a primary chamber 34 between the pistons 30 and 32 and a secondary chamber 36 between the end of the piston 32 and the end of the bore 24. A caged spring assembly generally indicated by the numeral 38 is disposed between the pistons 30 and 32 and yieldably maintains the latter a predetermined distance apart. A bracket 40 is carried on the end of the piston 30 and a spring 42 yieldably urges the pistons 30 and 32 as a unit to the right viewing FIG. 3, maintaining the bracket 40 in engagement with the end wall of the housing 22, thereby establishing the brake released position of the booster 12. Of course, the force exerted by the caged spring assembly 38 maintaining the piston 30 and 32 apart is greater than the force exerted by the spring 42; however, a piston stop 44 is also provided to prevent the piston 32 from moving too great a distance when the booster is released.

First and second reservoirs 46 and 48 are carried by the housing 22 and each is provided with a removable closure member 50, 52, so that the fluid pressure level in the reservoir 46 or 48 may be inspected and replenished if necessary. A passage 54 communicates the reservoirs 46 and 48 with one another, and an outlet port 56 communicates the reservoirs 46 and 48 with the aforementioned reservoir (not shown) at the inlet or low pressure side of the power steering pump 15. Compensating ports 58, 60, are provided which communicate the reservoir 46, 48 with corresponding chambers 36, 24, respectively. As is well known to those skilled in the design of master cylinders, fill ports 62, 64 communicates the reservoirs 46, 48 with annular chambers 66, 68 defined between the outer circumferential surface of the piston 32, 30 and the wall of the bore 24.

A spool valve 70 is slidably mounted in the bore 26 and is provided with spaced lands 72, 74 and 76 which cooperate with corresponding lands 78, and 80 on the wall of the bore 26 to define grooves 80, 82, 84 and 86. The inlet port 16 communicates with the groove 82, and the outlet port 18 communicates with the groove 80. Another outlet port 88 communicates with the groove 84, as do passages 90 and 92 which communicate the pressure chamber 28 with the groove 84. Still another passage 94 communicates the groove 86 with the reservoir 48. As is well known to those skilled in the art, movement of the spool valve 70 controls communication between the grooves 80, 82, 84 and 86 in a manner which will be described hereinafter. A return spring 96 yieldably urges the spool valve 70 to the right viewing FIG. 3, maintaining the stop ring 98 carried on the left hand end of the spool valve 70 in engagement with a shoulder provided on the wall of the bore 26.

One end of an operator-operated input rod 100 is slidably received in a blind bore 102 provided in the right hand end of the piston 30 and the other end of the input rod 100 is connected to the brake pedal 14 disposed in the operator's compartment of the vehicle. A spring 104 yieldably urges a bracket 106 which is slidable on the rod 100 into engagement with a retainer 108 secured to the rod 100. A first pivot 110 connects one end of a pair of levers 112 to the bracket 40 carried by the piston 30 and a second pivot 114 secures the other end of the levers 112 to a cap member 116 which is slidably mounted on the end of the spool valve 70. A third pivot 115 connects levers 112 to bracket 106. Details of the construction and operation of the mechanism which includes levers 112 are more completely described in U.S. Pat. No. 3,603,209, owned by the assignee of the present invention and incorporated herein by reference. A spring 118 normally maintains the cap member 116 away from openings 120 provided in the spool valve 70 to thereby permit fluid communication between the passage 92 and the pressure chamber 28. However, when a manual brake application is initiated, the cap member 116 moves to the left viewing FIG. 3 to close the ports 120, to prevent an abrupt communication of fluid pressure into pressure chamber 28 after initiation of a manual brake application, as will be hereinafter described.

Conduits 124 and 122 communicate the chambers 24 and 36 to adaptive braking valve means 126 and 128, respectively. The outlet of adaptive braking valve means 126 is communicated to the front wheel disc brakes 130 of the vehicle, while the outlet of the adaptive braking valve means 128 is communicated to the rear wheel drum brakes 132. Since the internal components of both the adaptive braking valve means 126 and 128 are identical, only the valve means 126 will be described in detail. The adaptive braking valve means 126 includes a housing 134 having an inlet port 136 communicated with the conduit 124 and an outlet port 138 communicated to the front wheel brakes 130. Passage means generally indicated by the numeral 140 normally communicates the inlet port 136 with the outlet port 138. A solenoid valve generally indicated by the numeral 142 includes an armature 144 and an actuating coil 146. The armature 144 carries a sphere 147 which is adapted to sealingly engage a valve seat 148 which forms a part of the passage means 140. A spring 150 normally urges the armature 144, and therefore the sphere 147, away from the valve seat 148, to thereby maintain the solenoid valve 142 in a normally open condition to permit substantially uninhibited fluid communication between the inlet port 136 and the outlet port 138. Valve housing 134 further includes another outlet port 152 which is communicated with the outlet port 56 of the reservoir 46 and with the reservoir (not shown) at the low pressure side of the pump 15 by conduit 154. Passage means generally indicated by the numeral 156 within the valve means 134 communicates the outlet port 152 with the outlet port 138. A solenoid valve generally indicated by the numeral 158 includes an armature 160 and a coil 162. A sphere 164 is carried by the armature 160 and is normally urged into sealing engagement with a valve seat 166 forming a part of the passage means 156 by a spring 168, to thereby maintain the solenoid valve 158 in a normally closed condition. Each of the solenoid valves 142 and 158 are provided with leads 168, 170, respectively, for connecting their corresponding coils 146, 162 with an electronic control unit (not shown). The electronic control unit is constructed to sense an incipient skid of one or more of the vehicle's wheels in accordance with the teaching of U.S. Pat. No. 3,494,671, owned by the assignee of the present invention and incorporated herein by reference. Of course, those skilled in the art will readily appreciate that any appropriate logic may be incorporated into the control unit which actuates the solenoid valves 142, 158.

Housing 134 further includes another inlet port 172 which is communicated to the outlet port 88 on the booster 12 by another conduit 174. A check valve 176 prevents communication between the port 172 and the passage means 140 unless the fluid pressure level at the inlet port 172 is higher than the fluid pressure level in the passage means 140. Of course, those skilled in the art will also recognize that the conduit 174 also communicates a corresponding port on the adaptive braking control valve means 128 with the port 88 on the booster 12. Similarly, another conduit 178 communicates a port on the valve means 128 corresponding with the port 152 on the valve means 126 with the reservoir at the low pressure side of the pump 15. It will also be noted that the reservoirs 46, 48 and the reservoir (not shown) at the inlet of the pump 15 are interconnected in such a way that a common reservoir at substantially the same fluid pressure level is provided. However, the reservoir 46 is segregated from the reservoir 48 so that in the case of loss of fluid from one of the reservoirs 46, 48 the other reservoir will be unaffected.

MODE OF OPERATION

Figure 3:
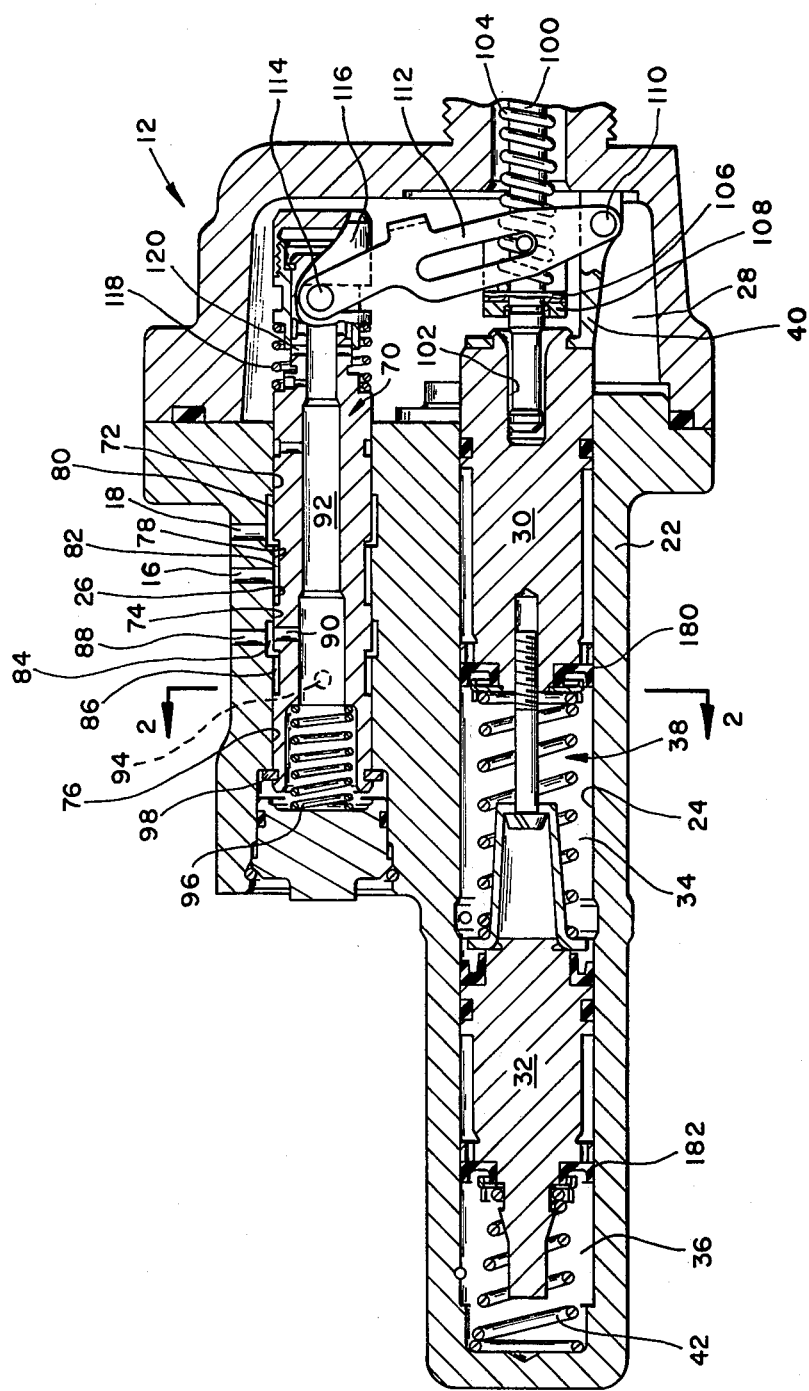
FIG. 3 is a longitudinal cross-sectional view taken substantially along lines 3—3 of FIG. 2.
Figure 4:
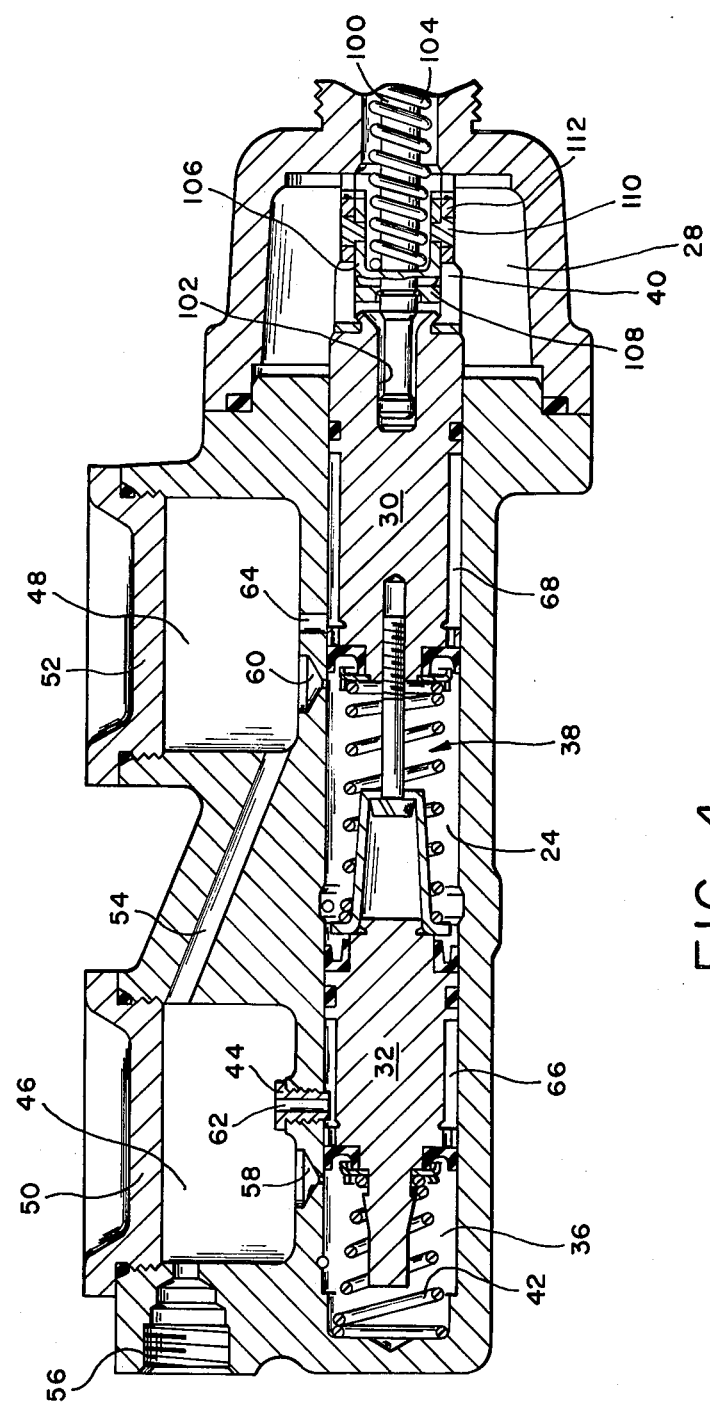
FIG. 4 is a longitudinal cross-sectional view taken substantially along lines 4-4 of FIG. 2.

The various complements of the brake booster 12 are illustrated in FIGS. 3 and 4 in the positions which they assume when the brakes of the vehicle are released. In this position, the spool valve 70 is so disposed that substantially uninhibited fluid communication is permitted between the grooves 82 and 80, to permit free flow of fluid through the booster between the pump 15 and the vehicle's power steering gear 20. Similarly, it will be noted that fluid communication between the grooves 82 and 84 is prevented, and fluid communication between the grooves 84 and 86 is permitted, thereby communicating the pressure chamber 28 and the conduit 174 to the reservoir 48 through the grooves 84 and 86 and the passage 94. When a brake application is effected, the operator-operated input rod 100 is moved to the left, thereby pivoting the levers 112 about the first pivot 110. Movement of the levers 112 shifts the spool valve 70 to the left, viewing FIG. 3, thereby closing the gap between the lands 72 and 78 to restrict flow of fluid between the grooves 82 and 80, to permit the pressure level in the groove 82 to increase. Simultaneously, the land 74 is lapped with the land 76 to terminate fluid communication between the grooves 84 and 86 to thereby terminate fluid communication between the pressure chamber 28 and the reservoir 48. As the valve shifts, the lands 74 and 78 are opened to permit the high pressure fluid being developed in the groove 82 to be communicated into the groove 84. High pressure fluid in the groove 84 is communicated into the pressure chamber 28 through the passages 90, 92 and 120. High pressure fluid in the pressure chamber 28 acts upon the right hand end of the piston 30 to urge the latter to the left viewing FIG. 3. Because of the construction of the caged spring 38, movement of the piston 30 will be transmitted to the piston 32 yieldably urging the latter to the left viewing FIG. 3. As the pistons 30, 32 shift, the annular seals 180, 182 on the forwardmost ends of the pistons close the compensating ports 60 and 58 to terminate fluid communication between the reservoir 46 and the chamber 36 and between the reservoir 48 and the chamber 46. Further movement of the piston 32 develops fluid pressure in the chamber 36, while further movement of the piston 30 partially collapses the caged spring 38 to develop fluid pressure in the chamber 24. Pressurized fluid developed in the chambers 24 and 36 are delivered to adaptive braking valve means 126 and 128, respectively, by conduits 124 and 122. Unless an adaptive braking cycle is initiated, substantially uninhibited fluid communication is permitted through the adaptive braking valve means 126, 128 to the front and rear brakes 130, 132 of the vehicle to initiate a brake application.

Figure 5:
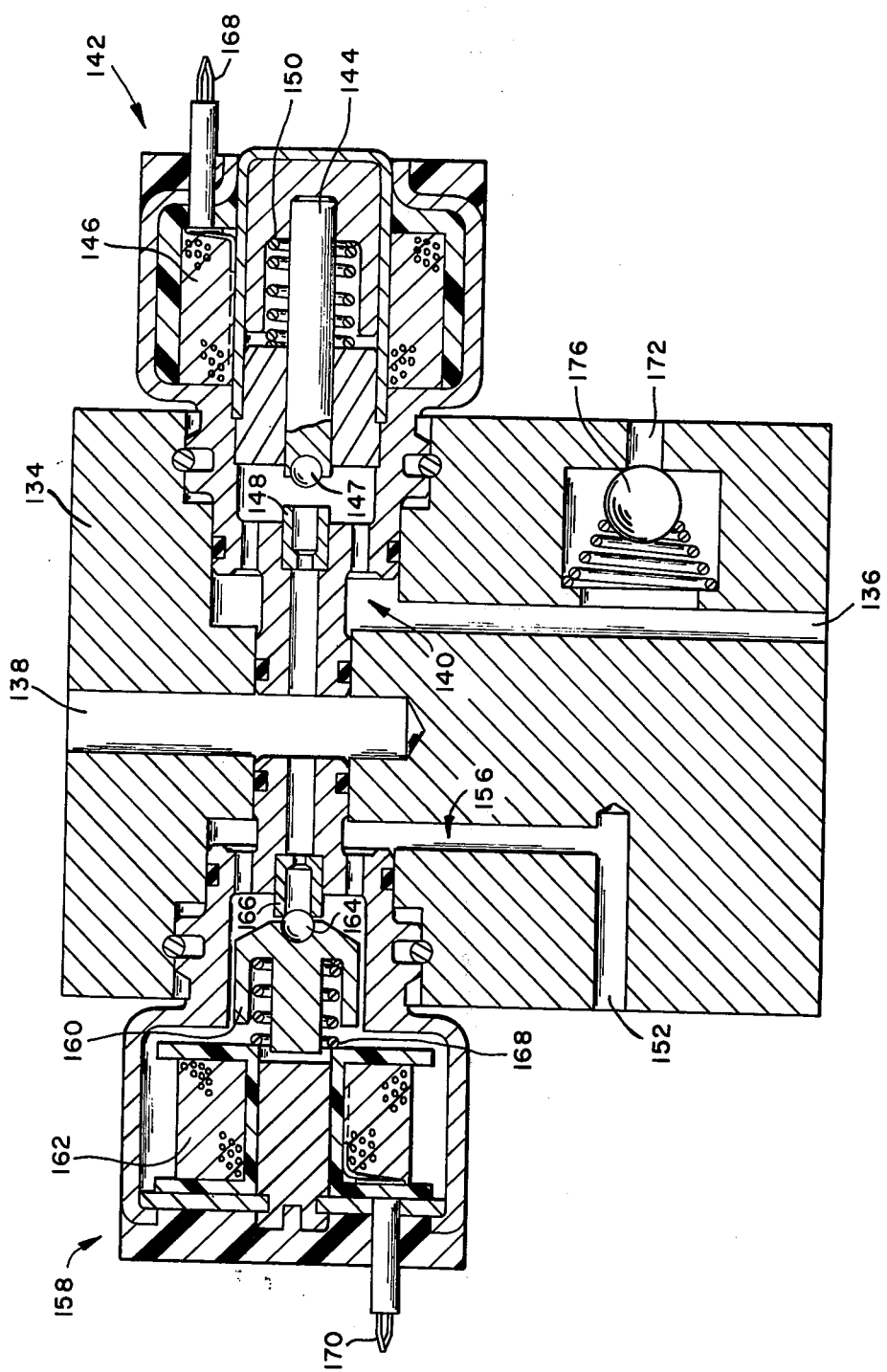
FIG. 5 is a cross-sectional view of an adaptive braking control valve made pursuant to the teachings of our present invention and which is used in the adaptive braking system illustrated in FIG. 1.

Referring now to FIG. 5, in a normal brake application substantially uninhibited fluid communication through the valve 126 between the inlet port 136 and the outlet port 138 through the passage means 140 is permitted, while fluid communication between the outlet ports 138 and 152 through the passage means 156 is prevented. Since the groove 84 is communicated with the high pressure fluid in the groove 82, high pressure fluid is communicated to the inlet port 172 of the valve means 126 through the outlet port 88 on the booster 12 and the conduit 174. However, the check valve 176 prevents fluid communication from the passage means 140 into the inlet port 172. When the electronic control unit senses an incipient skid condition of the brakes controlled by the adaptive braking control valve 126, the electronic control unit actuates the solenoid valves 142 and 158 to terminate fluid communication through the passage 140 and initiate fluid communication through the passage 156. Therefore, the front wheel brakes 130 of the vehicle are isolated from the high pressure fluid in the chamber 24, and the braking pressure in the front wheel brakes 130 is communicated to the low pressure reservoir through conduit 154 thereby reducing the braking pressure delivered to the brakes 130 to permit the front wheels of the vehicle to accelerate. When the front wheels of the vehicle have accelerated to a predetermined value, the electronic control unit signals the solenoid valves 158 and 142 to terminate communication through the passage means 156 and again initiate fluid communication through the passage means 140 to build braking pressure in the brakes 130. This action continues for an indefinite number of cycles, until the vehicle is brought to a safe stop.

It will be noted that since the chamber 24 has a finite volume, additional high pressure fluid must be provided to the adaptive braking control valve 126 as the latter cycles for more than a very few times. Since high pressure fluid is being communicated to the inlet port 172 through the conduit 174 and outlet port 88 of the booster, the check valve 176 permits fluid communication between the inlet port 172 and the passage means 140 whenever the pressure delivered to the inlet port 136 is less than the pressure delivered to the inlet port 172 by more than a predetermined amount. Therefore, the adaptive braking valve means 126 may cycle for an indefinite number of cycles. High pressure fluid from the groove 84 in the brake booster 12 is thereby permitted to "make up" or replenish the high pressure fluid being depleted from the chamber 24 by cycling of the adaptive braking valve means.

If the power steering pump 15 should fail, or if one of the conduits interconnecting the power steering pump 15, the gear 20, and the booster 12 should rupture, the increased actuation force required by the vehicle operator collapses the spring 104 to permit the end of the control rod 100 to engage the end of the blind bore 102. A direct link is thereby provided between the piston 30 and the brake pedal 14, to permit the pistons 30 and 32 to actuate manually in a manner similar to that effected by a conventional split system master cylinder. As described hereinabove, when a manual brake application is initiated, the cap 116 slides relative to the spool valve 70 to close the passages 120, to thereby prevent an abrupt communication of high pressure fluid into the pressure chamber 28 in case fluid pressure should suddenly be delivered to the booster 12.

It will also be noted that if any conduit in the system ruptures, except for the conduits 122 and 124 and the conduits connecting the valves 126 and 128 to the brakes 130 and 132, thereby permitting fluid to flow from the system, the fluid disposed in the reservoirs 46 and 48 will be relatively unaffected since they are isolated from the reservoir (not shown) at the inlet of the power steering pump 15. Similarly, if one of the conduits 122 or 124 should rupture, permitting the fluid content of one of the reservoirs 46 or 48 to become depleted, the fluid in the other reservoir 46 or 48 and in the reservoir (not shown) at the inlet of the power steering pump 15 will remain unaffected. Therefore, only one set of the brakes 130 or 132 will be lost, and pressurized fluid may still be delivered from the power steering pump 15 into the braking chamber 28 to effect a powered brake application of a single set of the vehicle's brakes. Therefore, the braking system of our invention provides fail-safe capabilities equal to that of a conventional split system master cylinder actuated by a conventional pneumatic brake booster.

We claim:

1. In a hydraulic boost device for a vehicle having front and rear wheel brakes:

a housing defining a bore therewithin;

first and second pistons slidable in said bore and defining a first compartment between the end of one of said pistons and the end of the bore, a second compartment between said pistons, and a pressure chamber between the opposite end of said bore and the other piston;

one of said compartments being communicated to at least one of the vehicle's brakes, the other compartment being communicated to the remainder of the brakes of the vehicle, said first and second compartments being communicated to a fluid reservoir; and operator-actuated valve means slidably mounted within said housing and slidable from a first position venting said pressure chamber to said reservoir to a second position communicating said pressure chamber to a pressure source, whereby fluid pressure in said pressure chamber shifts said pistons to develop braking pressure in said compartments;

said valve means having an inlet port and first, second and third outlet ports, said first outlet port being communicated to a fluid reservoir;

said valve means in said first position communicating said inlet port to the second outlet port and said pressure chamber and said third outlet port to said first outlet port, said valve means when disposed in said second position restricting flow of fluid between said inlet port and said second outlet port, communicating said inlet port with said pressure chamber and with said third outlet port, and terminating communication to said first outlet port.

2. The invention of claim 1:

there being two of said reservoirs, one for each of said compartments;

passage means extending through the wall of said bore to communicate each of said reservoirs with their corresponding compartments;

said third outlet port being a passage within said housing communicating said valve means with one of said reservoirs.

3. In a vehicle hydraulic braking system, a fluid pressure source, fluid containing reservoir means for supplying fluid to said pressure source, hydraulic boost means in fluid communication with said pressure source. and with said reservoir, said hydraulic boost means including a housing defining a bore therewithin, piston means slidably mounted in said bore and defining compartment means between one end of the piston means and a corresponding end of the bore and a pressure chamber between the opposite end of said piston means and the opposite end of the bore, said compartment means being communicated to the brakes of the vehicle, valve means within said housing shiftable from a brake released position venting said pressure chamber to said reservoir means to a brake applied position communicating said pressure source with said pressure chamber to actuate said piston means, said reservoir means including means defining a cavity segregating a quantity of the fluid in said reservoir means, and passage means communicating said segregated quantity of fluid into said compartment means.

4. The invention of claim 3, said segregating means permitting the fluid content of said segregated cavity to overflow into the remainder of the reservoir means.

5. The invention of claim 3, said reservoir means including said cavity, a portion communicating with the inlet of the pressure source, and a conduit communicating said cavity with said portion.

6. The invention of claim 5, said cavity being defined within said housing and having a common wall with said bore, said passage means extending through said common wall.

7. The invention of claim 3, said valve means venting said pressure chamber to said cavity when said valve means is disposed in said brake released position.

8. The invention of claim 3, said piston means including first and second pistons dividing said compartment into a first section communicated with some of the brakes of the vehicle and a second section communicated to the rest of the brakes of the vehicle, said cavity including means dividing the cavity into a first and second chamber, said passage means including a first passage communicating the first chamber with said first section and a second passage communicating said second chamber with said second section.

* * * * *